(12) United States Patent
Kameyama et al.

(10) Patent No.: US 7,973,868 B2
(45) Date of Patent: Jul. 5, 2011

(54) ACTIVE MATRIX SUBSTRATE, REFLECTION TYPE LIQUID CRYSTAL DISPLAY APPARATUS AND LIQUID CRYSTAL PROJECTOR SYSTEM

(75) Inventors: Hiroaki Kameyama, Kawasaki (JP); Masanobu Oomura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 263 days.

(21) Appl. No.: 12/422,644

(22) Filed: Apr. 13, 2009

(65) Prior Publication Data

US 2009/0262267 A1      Oct. 22, 2009

(30) Foreign Application Priority Data

Apr. 16, 2008 (JP) ................................. 2008-106802

(51) Int. Cl.
*G02F 1/136* (2006.01)
(52) U.S. Cl. ........................................................... 349/44
(58) Field of Classification Search ...................... 349/44
See application file for complete search history.

(56) References Cited

U.S. PATENT DOCUMENTS

| | | | | |
|---|---|---|---|---|
| 5,461,501 A | * | 10/1995 | Sato et al. ...................... | 349/42 |
| 5,990,988 A | | 11/1999 | Hanihara et al. ................ | 349/48 |
| 6,049,132 A | * | 4/2000 | Iwahashi et al. ............... | 257/763 |
| 2007/0279353 A1 | | 12/2007 | Oomura | |
| 2008/0259229 A1 | | 10/2008 | Oomura et al. | |
| 2009/0190047 A1 | | 7/2009 | Oomura | |

FOREIGN PATENT DOCUMENTS

JP     2006-267937     10/2006

* cited by examiner

*Primary Examiner* — Sung H Pak
(74) *Attorney, Agent, or Firm* — Fitzpatrick, Cella, Harper & Scinto

(57) ABSTRACT

An active matrix substrate for a reflection type liquid crystal display apparatus has an image display region 10 including a plurality of pixels 1 each having a reflection electrode 4*a* and a switching element 2, a black display region 11 including a plurality of pixels for providing only a black display each having a reflection electrode 4*b*, a wiring layer 111 between the switching elements 2 and the reflection electrodes, a light shielding layer 113 between the wiring layer 111 and the layer forming the reflection electrodes, a through hole 112*a* between the wiring layer 111 and the light shielding layer 113 in the image display region 10 for electrically connecting the reflection electrode 4*a* to the switching element 2, and a through hole 112*b* between the wiring layer 111 and the light shielding layer 113 in the black display region 11 and electrically isolated from the switching element 2.

9 Claims, 7 Drawing Sheets

ACTIVE MATRIX SUBSTRATE, REFLECTION TYPE LIQUID CRYSTAL DISPLAY APPARATUS AND LIQUID CRYSTAL PROJECTOR SYSTEM

BACKGROUND OF THE INVENTION

1. Field of the Invention

The present invention relates to an active matrix substrate including a matrix array of a plurality of pixels having a reflection electrode formed on a substrate, a reflection type liquid crystal display apparatus and a liquid crystal projector system using the same.

2. Description of the Related Art

The reflection type liquid crystal display apparatus is a known image display apparatus using an active matrix substrate and is widely used in liquid crystal projectors and reflection type liquid crystal displays (referred to as liquid crystal projector systems hereinafter), for example. The active matrix substrate used in the reflection type liquid crystal display apparatus has a matrix array of a plurality of pixels formed on a semiconductor substrate, such as a single-crystal silicon substrate, each of the pixels including a switching element and a pixel electrode having a reflective characteristic (referred to as a reflection electrode).

The active matrix substrate has a display region including a region in which pixels for displaying an image are arranged (referred to as an image display region hereinafter) and a region provided on the outer side of the image display region in which pixels provide only a black display (referred to as a black display region hereinafter). The active matrix substrate further has a region provided on the outer side of the image display region on the semiconductor substrate in which peripheral circuits, such as a vertical scanning circuit and a horizontal scanning circuit, are arranged (referred to as a peripheral circuit region). Japanese Patent Application Laid-Open No. 2006-267937 discusses improvement of the black display uniformity between the image display region and the black display region. To this end, according to the patent literature, the reflection electrodes in the image display region and the reflection electrodes in the black display region are arranged at substantially equal intervals, thereby improving the flatness between the image display region and the surrounding black display region. U.S. Pat. No. 5,990,988 discloses improvement of the panel flatness. To this end, according to the patent literature, the wiring layer between the switching elements and the reflection electrodes has a wiring pattern and a dummy pattern in a display region and a peripheral circuit region, thereby improving the precision of chemical mechanical polishing (CMP).

SUMMARY OF THE INVENTION

However, the techniques disclosed in the literatures described above cannot satisfy the requirements about the flatness of the reflection type liquid crystal display apparatus. The technique disclosed in the Japanese Patent Application Laid-Open No. 2006-267937 can improve the flatness of layers above the reflection electrodes but cannot improve the flatness of layers below the reflection electrodes. Thus, when the flatness of a layer below the reflection electrodes decreases, the flatness of the reflection electrodes and layers above the reflection electrodes also decreases. According to the U.S. Pat. No. 5,990,988, the dummy pattern of the wiring layer serves to reduce the pattern nonuniformity of the wiring layer to reduce the effect of the pattern nonuniformity of the wiring layer on the interlayer insulation film when an interlayer insulating film on the wiring layer is planarized by CMP, thereby improving the planarization by CMP. However, reducing the pattern nonuniformity of the wiring layer below the interlayer insulation film is not enough to adequately planarize the interlayer insulation film by CMP. In particular, since the surface area of the interlayer insulation film differs between the image display region and the black display region, the polishing rate in the CMP planarization also differs between the regions. Therefore, the flatness between the image display region and the black display region decreases in the layers below the reflection electrodes. As a result, black display can be nonuniform between the image display region and the black display region.

To solve the problems described above, the present invention aims to provide an active matrix substrate that can improve the black display uniformity and the image quality and a reflection type liquid crystal display apparatus.

An active matrix substrate for use in a reflection type liquid crystal display apparatus according to the present invention includes: a display region including a first display region in which a plurality of first pixels for displaying an image is arranged on a substrate, each of the first pixels having a reflection electrode and a switching element, and a second display region in which a plurality of second pixels for providing only a black display is arranged on the substrate, each of the second pixels having a reflection electrode; a wiring layer arranged between the switching elements and the reflection electrodes; a light shielding layer arranged between the wiring layer and the layer forming the reflection electrodes; a first through hole arranged between the wiring layer and the light shielding layer in the first display region, for electrically connecting the reflection electrode of each first pixel to the switching element of the first pixel; and a second through hole arranged between the wiring layer and the light shielding layer in the second display region and electrically isolated from the switching element.

A reflection type liquid crystal display apparatus according to the present invention includes: the active matrix substrate described above; a transparent substrate arranged to be opposed to the reflection electrodes of the active matrix substrate; and a liquid crystal sealed between the active matrix substrate and the transparent substrate.

A liquid crystal projector system according to the present invention includes: the reflection type liquid crystal display apparatus described above; a light source for illuminating with light the reflection type liquid crystal display apparatus; and a projection lens for projecting the light reflected from the reflection type liquid crystal display apparatus.

According to the present invention, the difference in surface area of the interlayer insulation film between the image display region and the black display region can be reduced, and therefore, the difference in polishing rate in planarization by CMP can be reduced. As a result, the surface height difference between the image display region and the black display region can be reduced, and therefore, the flatness of layers below the reflection electrodes between the image display region and the black display region is improved. As a result, an active matrix substrate and a reflection type liquid crystal display apparatus improved in black display uniformity and image quality can be provided.

Further features of the present invention will become apparent from the following description of exemplary embodiments (with reference to the attached drawings).

DESCRIPTION OF THE EMBODIMENTS

Figure 1:
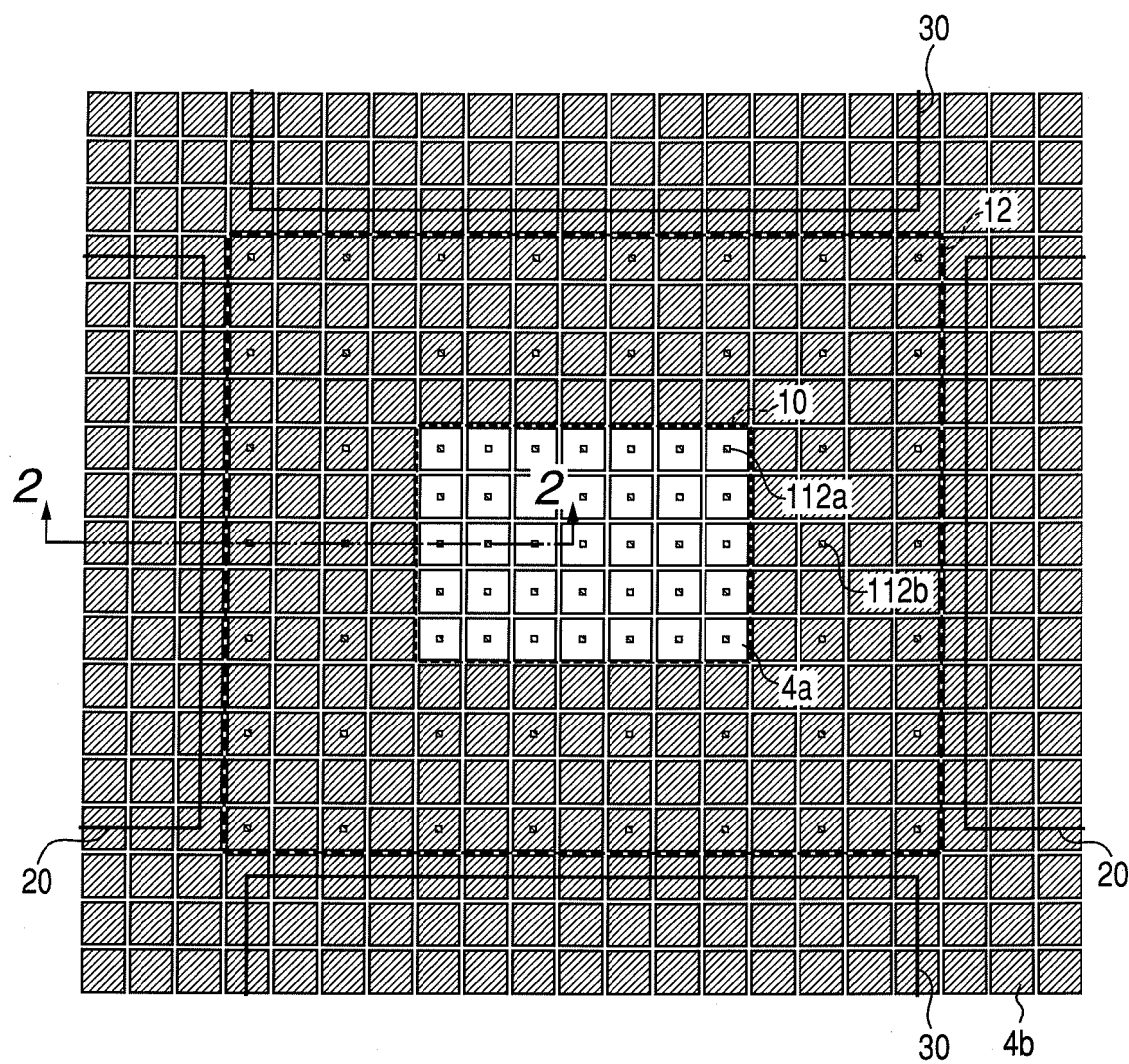
FIG. 1 is a schematic plan view of a projection region of an active matrix substrate for use in a reflection type liquid crystal display apparatus according to a first embodiment of the present invention.

In the following, an active matrix substrate and a reflection type liquid crystal display apparatus according to exemplary embodiments of the present invention will be described in detail with reference to the drawings. Note that, in the description of the exemplary embodiments of the present invention, components having the same functions are denoted by the same reference numerals throughout the drawings, and redundant descriptions will be omitted.

First Embodiment

Figure 2:
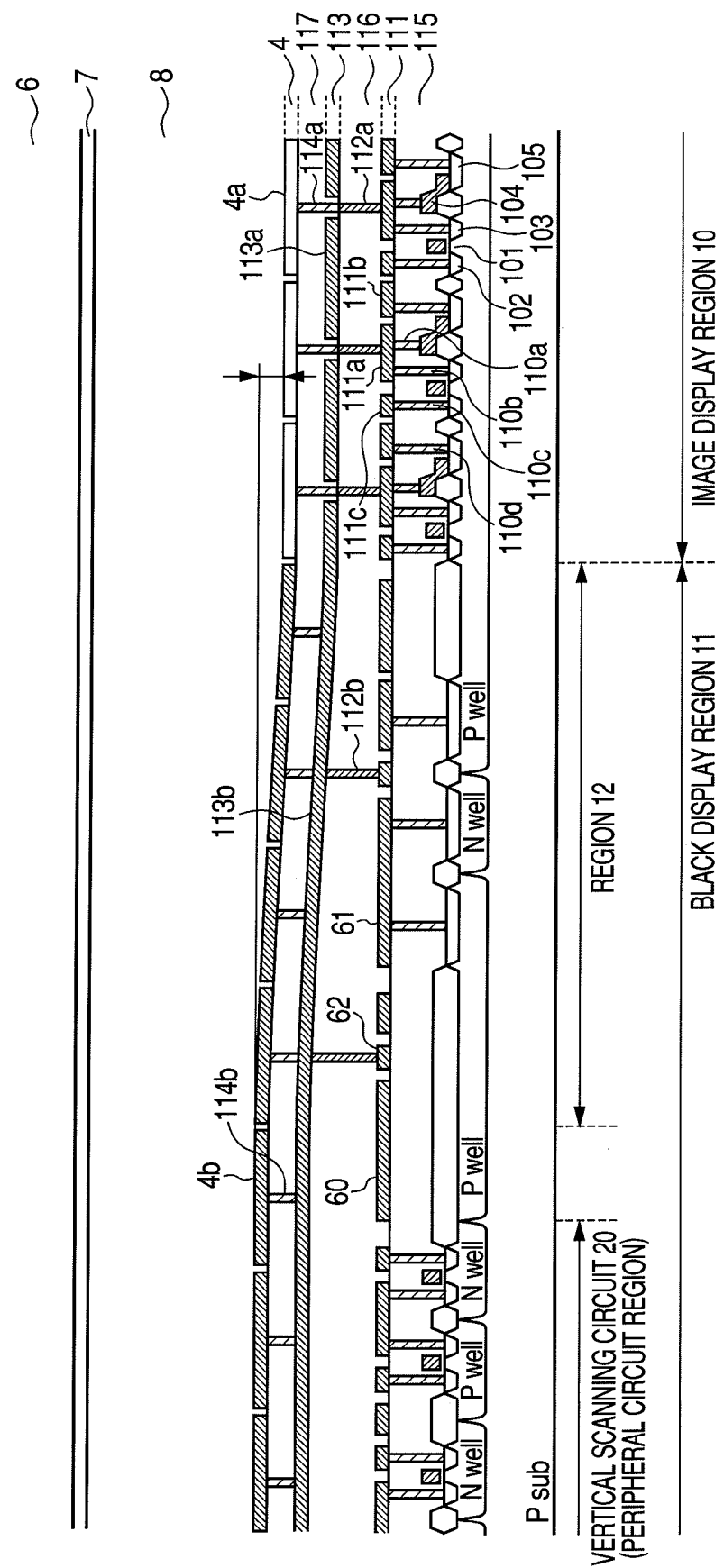
FIG. 2 is a schematic cross-sectional view of the active matrix substrate shown in FIG. 1 taken along the line 2-2.
Figure 3:
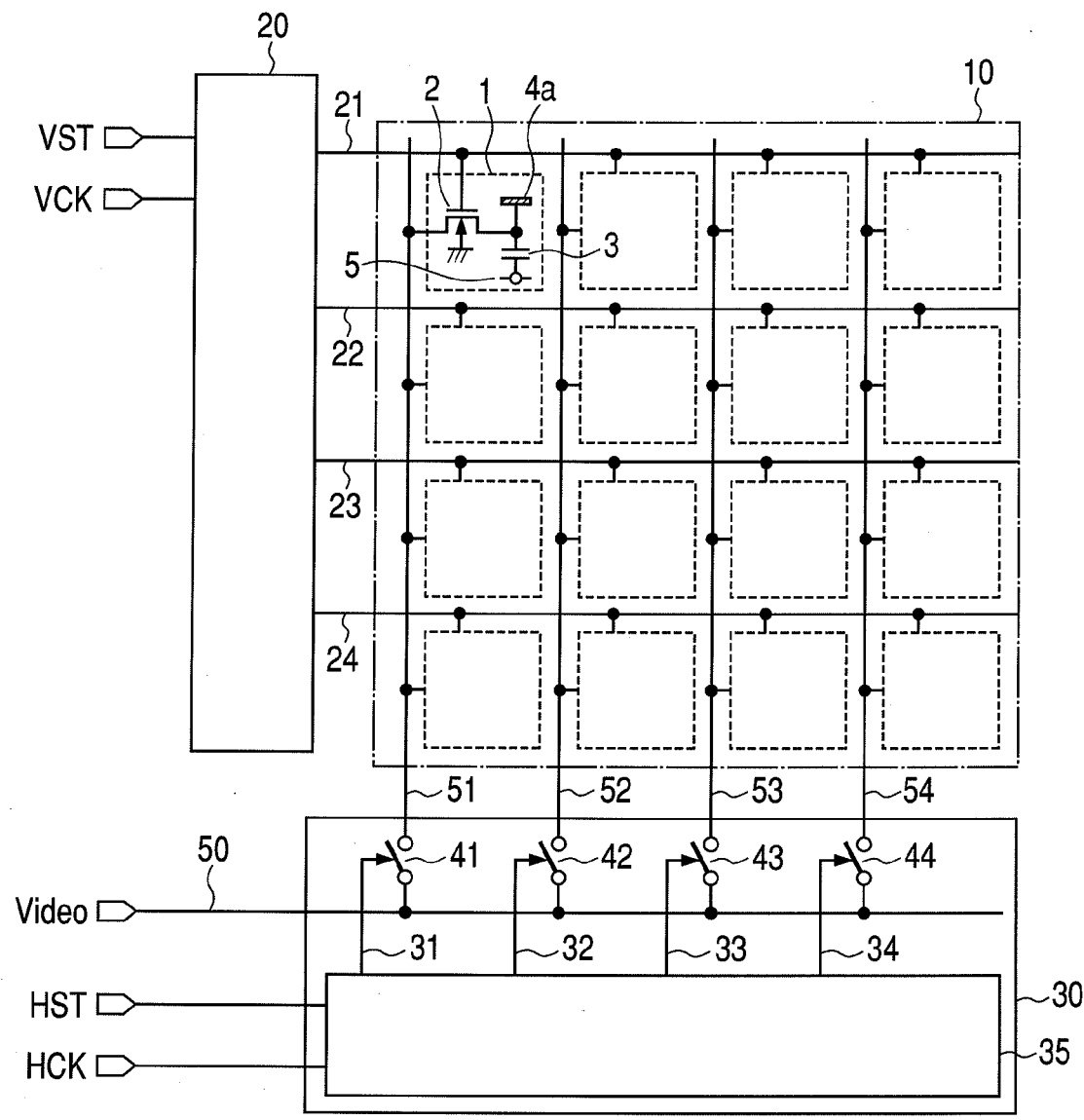
FIG. 3 is a schematic equivalent circuit diagram illustrating the reflection type liquid crystal display apparatus according to the first embodiment of the present invention.

With reference to FIGS. 1 to 5, an active matrix substrate and a reflection type liquid crystal display apparatus according to a first embodiment of the present invention will be described in detail. First, referring to FIG. 3, an exemplary circuit of the reflection type liquid crystal display apparatus will be described. FIG. 3 is a schematic equivalent circuit diagram illustrating the reflection type liquid crystal display apparatus according to the first embodiment of the present invention. Note that, in FIG. 3, illustration of pixels for providing only black display is omitted.

An image display region 10 has a matrix array of a plurality of pixels 1 for displaying an image (which correspond to first pixels according to the present invention) formed on a substrate. Each pixel 1 has a switching element 2, a holding capacitor 3 and a reflection electrode 4a. The switching element 2 is a MOS transistor formed on a single-crystal semiconductor substrate, for example, and has a gate electrode that serves as a control electrode and a source electrode and a drain electrode that serve as main electrodes. One of the main electrodes of the switching element 2 is electrically connected to the reflection electrode 4a and one of the electrodes of the holding capacitor 3. The other electrode of the holding capacitor 3 is electrically connected to a line 5 for supplying a first reference voltage. The other electrodes of the holding capacitors 3 of the other pixels 1 are also connected to the line 5. The first reference voltage can be a predetermined fixed potential that can be appropriately set. For example, the first reference voltage can be equal to a second reference voltage applied to a transparent electrode (not shown) of a transparent substrate. In that case, the line 5 is a constant voltage line. A liquid crystal material is sealed in the space between the reflection electrodes 4a and the transparent electrode (not shown), and the arrangement of the liquid crystal molecules is controlled based on the voltage between the reflection electrodes 4a and the transparent electrode.

In the plurality of pixels 1 in the image display region 10, the gate electrodes of the switching elements 2 are electrically connected to gate lines 21 to 24 on a row basis, and the other main electrodes of the switching elements 2 are electrically connected to signal lines 51 to 54 on a column basis.

A vertical scanning circuit 20 is connected to the gate lines 21 to 24 and vertically scans the image display region 10 by applying a driving signal to the gate electrodes of the switching elements 2 through the gate lines 21 to 24 on a row basis. To the vertical scanning circuit 20, a vertical scan start signal VST that determines the start of vertical scanning and a vertical scan clock signal VCK that determines the timing of vertical scanning are input. Note that the vertical scanning circuit 20 is disposed on the outer side of the image display region 10 on the substrate, or in other words, in a peripheral region of the image display region 10 on the substrate and corresponds to a peripheral circuit according to the present invention.

A horizontal scanning circuit 30 has a horizontal shift register 35 and switching circuits 41 to 44. The switching circuits 41 to 44 are provided in a one-to-one relationship with the signal lines 51 to 54, respectively. One group of terminals of the switching circuits 41 to 44 are electrically connected to the associated signal lines 51 to 54. The other group of terminals of the switching circuits 41 to 44 are electrically connected to a video signal line 50. To the video signal line 50, an analog video signal corresponding to an image to be displayed is input. The horizontal shift register 35 applies control signals 31 to 34 to control terminals of the switching circuits 41 to 44, thereby controlling the switching circuits 41 to 44 to achieve horizontal scanning of the image display region 10. To the horizontal shift register 35, a horizontal scan start signal HST that determines the start of horizontal scanning and a horizontal scan clock signal HCK that determines the timing of horizontal scanning are input. Note that the horizontal scanning circuit 30 is disposed on the outer side of the image display region 10 on the substrate, or in other words, in a peripheral region of the image display region 10 on the substrate and corresponds to a peripheral circuit according to the present invention. The vertical scanning circuit 20 and the horizontal scanning circuit 30 include a shift register and the like. Detailed structures and operations thereof are disclosed in many literatures, and thus, descriptions thereof will be omitted herein.

Figure 4:
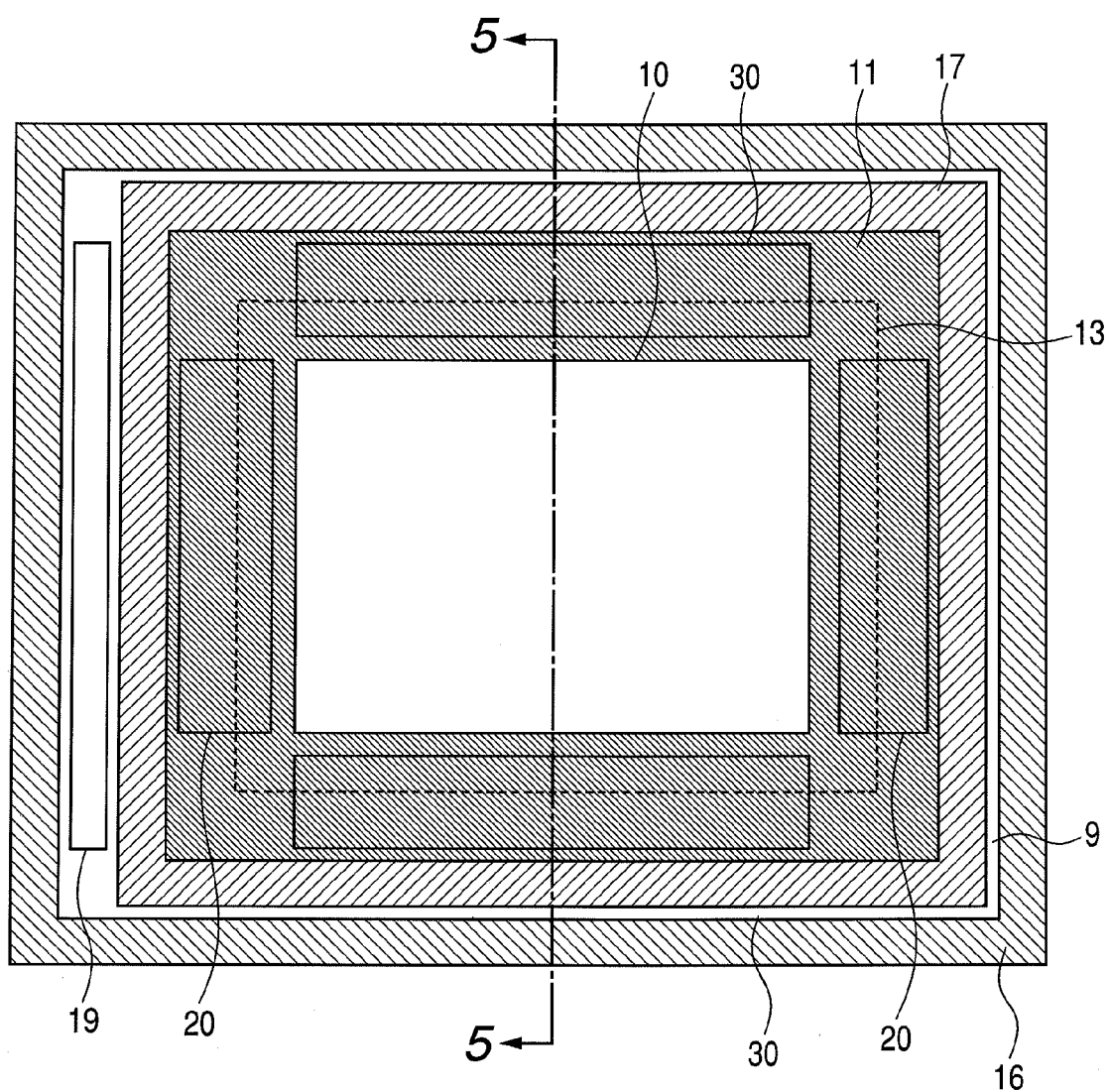
FIG. 4 is a schematic plan view of the reflection type liquid crystal display apparatus according to the present invention.
Figure 5:
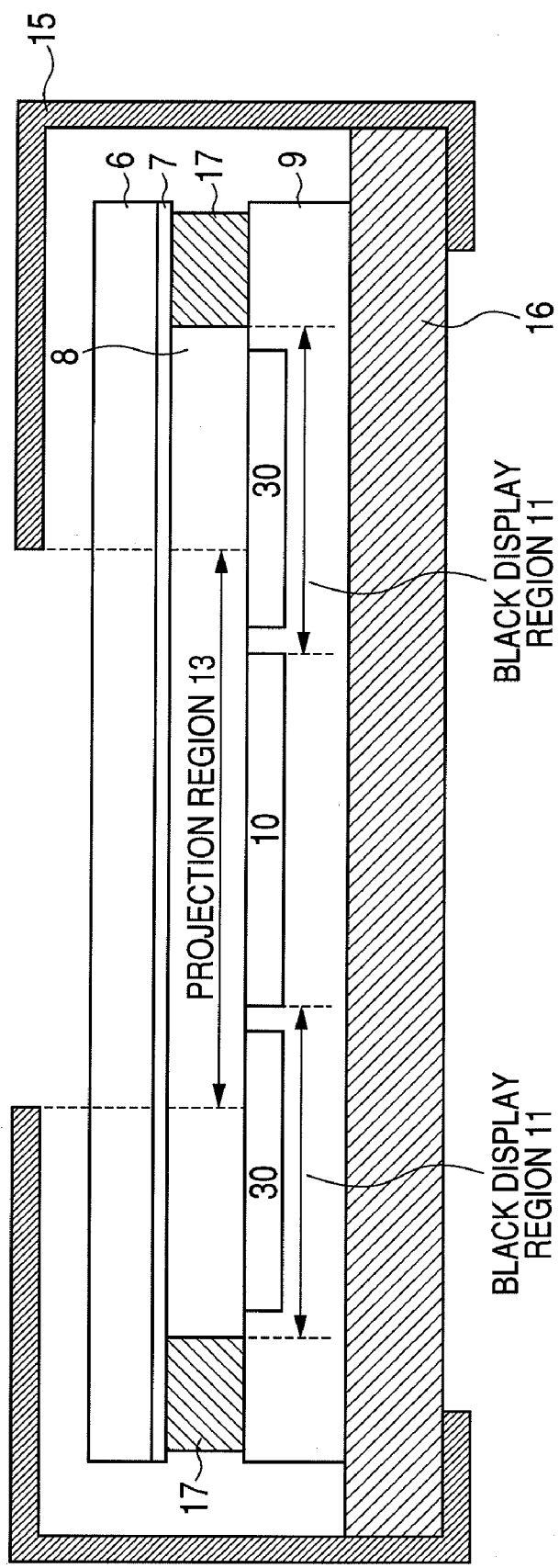
FIG. 5 is a schematic cross-sectional view of the reflection type liquid crystal display apparatus shown in FIG. 4 taken along the line 5-5.

Next, referring to FIGS. 4 and 5, an arrangement of a reflection type liquid crystal display apparatus according to the present invention will be described. FIG. 4 is a schematic plan view of a reflection type liquid crystal display apparatus of the present invention. FIG. 5 is a schematic cross-sectional view of the reflection type liquid crystal display apparatus shown in FIG. 4 taken along the line 5-5.

As shown in FIG. 4, the image display region 10, a PAD part 19, the vertical scanning circuit 20 and the horizontal scanning circuit 30 are provided on an active matrix substrate 9 according to the present invention that uses a single-crystal silicon substrate as the single-crystal semiconductor substrate. The active matrix substrate 9 is fixed on a radiator plate 16.

The image display region 10 is disposed at the center of the active matrix substrate 9. The peripheral circuits including the vertical scanning circuit 20 and the horizontal scanning circuit 30 are disposed on the outer side of the image display region 10 on the active matrix substrate 9, or in other words, in a peripheral region of the image display region 10. Note that the region of the active matrix substrate 9 in which the peripheral circuits are disposed is referred to as a peripheral circuit region.

For simplicity of description, FIG. 3 illustrates only one vertical scanning circuit 20. However, FIG. 4 illustrates two vertical scanning circuits 20 disposed symmetrically with respect to the center of the image display region 10. Similarly, whereas FIG. 3 illustrates only one horizontal scanning circuit 30, FIG. 4 illustrates two horizontal scanning circuits 30 disposed symmetrically with respect to the center of the image display region 10. Such an arrangement helps reduce the polishing nonuniformity in planarization by CMP. Note that only one of the symmetrically disposed vertical scanning circuits 20 or horizontal scanning circuits 30 can be operable, and the other can be a dummy circuit.

A sealing material 17 determines the distance between a transparent substrate 6 shown in FIG. 5 and the active matrix substrate 9 and seals a liquid crystal 8 injected between the transparent substrate 6 and the active matrix substrate 9. The sealing material 17 is disposed on the active matrix substrate 9 to surround the image display region 10 and the peripheral circuit region on the active matrix substrate 9. Note that the region of the active matrix substrate 9 in which the sealing material 17 is disposed is referred to as a sealing region.

A black display region 11 is disposed on the outer side of the image display region 10 between the image display region 10 and the sealing region and includes the peripheral circuit region. Shapes, positions and connections of the reflection electrodes in the black display region 11 will be described in detail later. The region of the active matrix substrate 9 including the image display region 10 and the black display region is referred to as a display region.

As shown in FIG. 5, the transparent substrate 6 is opposed to a surface of the active matrix substrate 9 on which the reflection electrodes 4a are prepared. The surface of the active matrix substrate 9 on which the reflection electrodes 4a are prepared is referred to as a first surface, and the surface of the active matrix substrate 9 opposite to the first surface, which is opposed to the radiator plate 16, is referred to as a second surface. A transparent electrode 7 is disposed on a surface of the transparent substrate 6 that is opposed to the reflection electrodes 4a on the active matrix substrate 9. The second reference voltage, which is a predetermined fixed potential that can be appropriately set, is applied to the transparent electrode 7, and the transparent electrode 7 serves as a common electrode for the pixels in the display region. Note that the second reference voltage is preferably a predetermined fixed potential that can be appropriately set. For example, the second reference voltage can be equal to the second reference voltage applied to the other electrodes of the holding capacitors 3. The liquid crystal 8 is sealed in the space defined by the first surface of the active matrix substrate 9, the transparent electrode 7 and the sealing material 17. The arrangement of the molecules of the liquid crystal 8 is controlled by the voltage between the reflection electrodes 4a and the transparent electrode 7.

A light shielding frame 15 defines a projection region 13 in the application of a liquid crystal projector system. That is, the active matrix substrate 9 is irradiated with only the light passing through the opening of the light shielding frame 15 to provide an output image. The projection region 13 is a region of the active matrix substrate 9 irradiated with the light passing through the opening of the light shielding frame 15 and includes the image display region 10 and a part of the black display region 11 close to the image display region 10. In the case of the liquid crystal projector system that projects a large image on a screen, the collected light is applied also to the light shielding frame 15, so that the temperature of the light shielding frame 15 rises. Therefore, the light shielding frame 15 is fixed to the radiator plate 16 without being in contact with the active matrix substrate 9. Thus, taking into account the precision of processing and assembly of the light shielding frame 15, the projection region 13 needs to be larger than the image display region 10 and include a part of the black display region 11. In addition, if the peripheral circuit region is disposed on the outer side of the projection region 13, the chip size increases, and the cost also increases. To avoid this, the peripheral circuit region needs to be disposed in the vicinity of the image display region 10 in the black display region 11, and the projection region 13 desirably includes a part of the peripheral circuit region that is included in the black display region 11.

Next, referring to FIGS. 1 and 2, the projection region 13 shown in FIG. 5 will be described in detail. FIG. 1 is a schematic plan view of the projection region of the active matrix substrate for use in the reflection type liquid crystal display apparatus according to the first embodiment of the present invention. FIG. 2 is a schematic cross-sectional view of an active matrix panel shown in FIG. 1 taken along the line 2-2. Note that FIG. 1 is an enlarged view of the projection region 13 of the active matrix substrate 9 shown in FIGS. 4 and 5.

The image display region 10 shown in FIG. 1 includes 5 rows and 7 columns of pixels for displaying an image described with reference to FIG. 3 arranged on the single-crystal silicon substrate. The black display region 11 is disposed on the single-crystal silicon substrate on the outer side of the image display region 10 to surround the image display region 10. A pixel for providing only black display in the black display region 11 is made of the same conductive layer as the reflection electrode 4a of the pixel 1 in the image display region 10 and has a reflection electrode 4b having substantially the same shape (pitch, area or the like) as the reflection electrode 4a. The pixel for providing only black display corresponds to a second pixel according to the present invention. The reflection electrode 4b is opposed to the transparent electrode 7 of the transparent substrate 6. A predetermined voltage is applied to the reflection electrode 4b, and the liquid crystal 8 is controlled to be a black display state by the potential difference between the reflection electrode 4b and the transparent electrode 7. The reflection electrode 4b is not electrically connected to the switching element 2 of the pixel 1, and a predetermined voltage to provide black display is applied to the reflection electrode 4b without intervention of the switching element 2 of the pixel 1. Note that FIGS. 1 and 2 illustrate the reflection electrode 4b by hatching.

As shown in FIG. 2, in the image display region 10, NMOS transistors serving as the switching elements 2 described with reference to FIG. 3 are arranged on the single-crystal silicon substrate. The NMOS transistor has a gate 101 serving as the control electrode of the switching element and a source region 102 and a drain region 103 serving as two main electrodes of the switching element. The gate 101 is made of polysilicon, and the source region 102 and the drain region 103 are N-type impurity diffusion regions formed in a P-type well region of a P-type single-crystal silicon substrate. A holding capacitor electrode 104 is one of the electrodes of the holding capacitor 3 and is made of polysilicon. A common electrode 105 is the other of the electrodes of the holding capacitor 3 and is formed as an N-type impurity diffusion region.

The holding capacitor electrode 104 of the holding capacitor 3 and the drain region 103 of the switching element 2 are connected to each other via contacts 110a and 110b and a first wiring layer 111a. The drain region 103 is electrically connected to the reflection electrode 4a formed by a third wiring layer 4 via the contact 110b, the first wiring layer 111a, a first through hole 112a and a second through hole 114a. The first reference voltage is applied to the common electrode 105 of the holding capacitor 3 via a contact 110d and a first wiring layer 111b. The source region 102 of the switching element 2 is electrically connected to a first wiring layer 111c, which forms a signal line, via a contact 110c.

The first wiring layer 111 is disposed between the third wiring layer 4 forming the reflection electrode 4a and the switching element 2. A second wiring layer 113 is disposed between the third wiring layer 4 and the first wiring layer 111. In the image display region 10, a light shielding layer 113a formed by the second wiring layer 113 has openings formed in a one-to-one relationship with the pixels 1. The openings allow direct connection between the first through holes 112a and the third through holes 114a. Note that the present invention is not limited to the structure described above, and the first through hole 112a and the third through hole 114a can be electrically connected to each other via a part of the second wiring layer 113 that is electrically isolated from the light shielding layer 113a.

On the other hand, in the black display region 11, a light shielding layer 113b formed by the second wiring layer 113 is electrically connected to all the reflection electrodes 4b in the black display region 11 via fourth through holes 114b, and a predetermined voltage to provide black display is applied to the light shielding layer 113b. The vertical scanning circuit 20, which is a peripheral circuit, a reference voltage line 60 and a power supply line 61 are disposed below the third wiring layer 4 in the black display region 11 that forms the reflection electrodes 4b. The region in which the vertical scanning circuit 20 and the horizontal scanning circuit 30 are disposed is referred to as a peripheral circuit region. The reference voltage line 60 is a constant voltage line for supplying the first reference voltage to the common electrode 105. The power supply line 61 is a constant voltage line for supplying a substrate voltage to the P-type well region in the image display region 10. Note that, the reference voltage line 60 and the power supply line 61 are formed to surround the image display region 10 and can be formed by the first wiring layer 111 between the image display region 10 and the peripheral circuit region. The region between the image display region 10 and the peripheral circuit region in which the constant voltage lines can be formed is referred to as a wiring region.

A first interlayer insulation film 115 is disposed between the switching element 2 and the first wiring layer 111. A second interlayer insulation film 116 is disposed between the first wiring layer 111 and the second wiring layer 113. A third interlayer insulation film 117 is disposed between the second wiring layer 113 and the third wiring layer 4. Each interlayer insulation film is formed by an inorganic insulation film, such as a silicon oxide film. The contacts 110 are formed in the first interlayer insulation film 115 by burying a metal having a high melting point, such as tungsten, by CVD. Similarly, the first through holes 112 are formed in the second interlayer insulation film 116, and the third through holes 114 are formed in the third interlayer insulation film 117. The first and second through holes are formed by burying a metal having a high melting point, such as tungsten, by CVD. The surface of the layer of the metal having a high melting point and the surface of the interlayer insulation film on which the layer is deposited are planarized by chemical mechanical polishing (CMP).

When the reflection type liquid crystal display apparatus is set to be normally black by controlling the liquid crystal 8, the pixels in the black display region 11 can be made to provide black display by applying a voltage to the reflection electrodes 4b so that the potentials at the reflection electrodes 4b and the transparent electrode 7 in the black display region 11 are substantially equal to each other. When the reflection type liquid crystal display apparatus is set to be normally white, the pixels in the black display region 11 can be made to provide black display by providing a circuit that supplies a voltage that makes the reflection electrodes 4b in the black display region 11 provide black display.

According to this embodiment, in a region 12 defined by the broken line in FIG. 1, a second through hole 112b is formed in the second interlayer insulation film 116 between the second wiring layer 113 forming the light shielding layer 113b and the first wiring layer 111. The second through hole 112b is electrically connected to the light shielding layer 113b and is electrically isolated from, that is, not electrically connected to the switching element 2. In other words, the second through hole 112b is a dummy through hole. According to this embodiment, the second through hole 112b is electrically connected to a line 62 that is formed by the first wiring layer 111 as with the reference voltage line 60 and the power supply line 61. A voltage equal to the voltage for providing black display applied to the light shielding layer 113b can be applied to the line 62. Alternatively, the line 62 can be floating. It is essential only that the line 62 is electrically isolated from the switching element 2. The second through hole 112b and the line 62 are disposed in the black display region 11. According to this embodiment, the second through hole 112b and the line 62 are disposed in the region 12 in the black display region 11 between the image display region 10 and a first peripheral circuit region. The region 12 includes the wiring region, and the second through hole 112b and the line 62 are disposed in the wiring region. The line 62 is disposed close to the reference voltage line 60 and the power supply line 61, and the second through hole 112b is disposed between, and electrically connected to, the line 62 and the light shielding layer 113b. Note that, although the second through hole 112b is disposed in the wiring region in this embodiment, the present invention is not limited to this arrangement, and the second through hole 112b can be disposed in any location in the black display region 11. However, the peripheral circuit region in the black display region 11 includes many signal lines, so that it is difficult to provide the second through hole 112b and the line 62 in the peripheral circuit region. Therefore, the second through hole 112b and the line 62 are preferably disposed in the black display region 11 excluding the peripheral circuit region and more preferably disposed between the image display region 10 and the peripheral circuit region in the black display region 11. The wiring region between the image display region 10 and the peripheral circuit region is preferred as the region in which the second through hole 112b and the line 62 are disposed, because the wiring region has a low wiring density.

According to this embodiment, the first through hole 112a and the second through hole 112b are formed by burying a metal having a high melting point, such as tungsten, in the second interlayer insulation film 116 and processing the surface thereof by CMP. In the image display region 10, the same number of first through holes 112a as the pixels are disposed at the same intervals as the pixels. In the black display region 11 on the outer side of the region 12, no second through hole 112b is disposed. In this case, since the density of the first through holes 112a in the image display region 10 is high, the surface area of the second interlayer insulation film 116 is small, and thus, the polishing rate is high. On the other hand, in the black display region 11 on the outer side of the region 12, since there is no second through hole 112b, the surface area of the second interlayer insulation film 116 to be polished is large, and thus, the polishing rate is high. That is, in formation of the first through holes 112a and the second through holes 112b, the polishing rate of CMP significantly differs between the image display region 10 and the black display region 11. As a result, if no second through hole 112b is disposed in the black display region 11, a steep height difference occurs between the image display region 10 and the black display region 11. Such a steep height difference does not pose a problem in the process of forming wiring for a common IC but has a significant effect on the characteristics of the reflection type liquid crystal display apparatus, such as the orientation of the liquid crystal molecules, the diffracted light between the reflection electrodes and the reflection characteristics of the reflection electrodes. Therefore, a problem can occur that the reflection characteristics vary between the image display region 10 and the black display region 11, and a black display nonuniformity occurs at the boundary between the image display region 10 and the black display region 11.

To solve the problem, according to the present embodiment, the second through holes 112b are disposed in the black display region 11 to reduce the difference in polishing rate of CMP of the second interlayer insulation film 116 between the image display region 10 and the black display region 11. In this way, the height difference of the surface of the second interlayer insulation film 116 between the image display region 10 and the black display region 11 is reduced. Since the peripheral circuit region has signal lines formed therein with a high density as described above, it is difficult to dispose the second through holes 112b and the line 62 in the peripheral circuit region. Thus, if a plurality of second through holes 112b is disposed in the region 12 with the same density as the first through holes 112a, a steep height difference can occur at the boundary between the region 12 and the peripheral circuit region. Pixels in the vicinity of the boundary between the region 12 and the peripheral circuit region can also be used for black display, and therefore, a problem can occur that a black display nonuniformity occurs at the boundary between the region 12 and the peripheral circuit region. The steep height difference can be eliminated by adequately spacing the peripheral circuit region apart from the image display region 10. However, in that case, the chip size is undesirably large. Thus, according to this embodiment, a plurality of through holes 112b is disposed in the region 12 in the black display region 11 between the image display region 10 and the peripheral circuit region with a density lower than the density of the plurality of first through holes 112a in the image display region 10. As a result, the height difference of the surface of the second interlayer insulation film 116 between the region 12 and the peripheral circuit region is reduced. In addition, although a height difference still remains between the image display region 10 and the peripheral circuit region, the height difference is less steep, the black display variation because of the height difference is moderate, and thus, the black display nonuniformity is less significant. In addition, the region 12 includes the wiring region in which the constant voltage lines, such as the reference voltage line 60 and the power supply line 61, can be disposed. The wiring density of the wiring region is lower than that of the peripheral circuit region, and the second through holes 112b and the line 62 can be more easily disposed in the wiring region. Thus, according to this embodiment, the black display uniformity between the image display region 10 and the black display region 11 can be improved without increasing the chip size.

In this embodiment described above, the second through holes 112b are disposed in the black display region 11 between the image display region 10 and the peripheral circuit region. However, the present invention is not limited to the arrangement. For example, the second through holes 112b can be disposed in the black display region 11 on the outer side of the peripheral circuit region or a corner region of the black display region 11 (a region adjacent to both the vertical scanning circuit 20 and the horizontal scanning circuit 30). The same holds true for the other embodiments.

Furthermore, in this embodiment, one second interlayer insulation layer 116 and one first wiring layer 111 are disposed below the second wiring layer 113 that forms the light shielding layers 113a and 113b. However, the present invention is not limited to the arrangement. For example, a multilayer wiring structure including two second interlayer insulation films 116 and two first wiring layers 111 is also possible. If the multilayer wiring structure is formed below the second wiring layer 113, the flexibility of layout of wiring increases, and the capability of shielding the semiconductor silicon substrate from light improves. The same holds true for the other embodiments.

Furthermore, in this embodiment described above, the second through holes 112b are disposed on the line 62. However, the present invention is not limited to the arrangement. The second through holes 112b can be disposed directly on the second interlayer insulation film 116. However, from the view point of formation of the second through holes 112b, the second through holes 112b are preferably formed on the line 62. The same holds true for the other embodiments. The through holes in the present invention are intended to electrically connect conductive layers disposed on the opposite sides of an interlayer insulation film to each other and is formed by a through hole formed in the interlayer insulation film and a conductive material filling the through hole.

Second Embodiment

Figure 6:
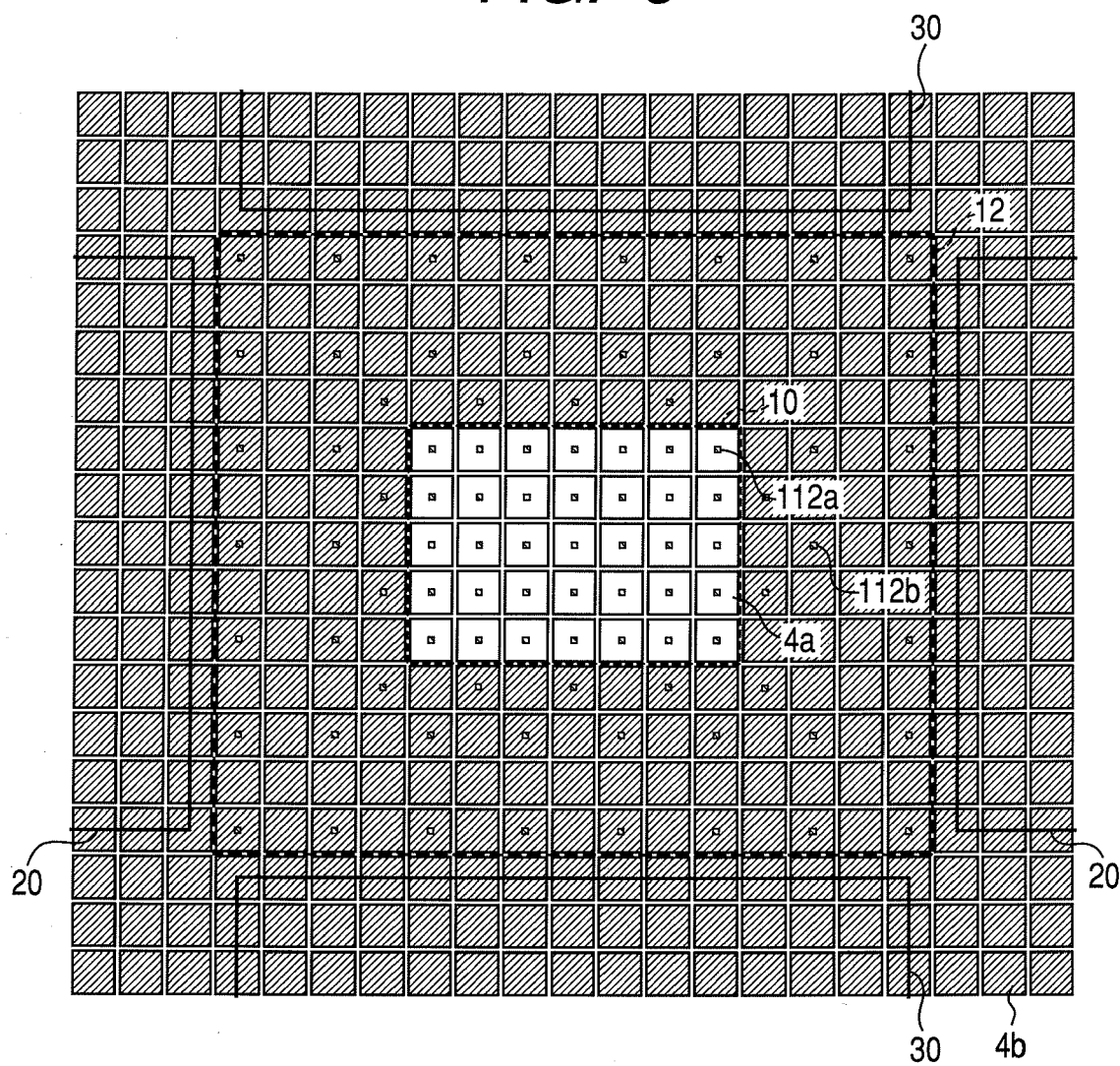
FIG. 6 is a schematic plan view of a projection region of an active matrix substrate for use in a reflection type liquid crystal display apparatus according to a second embodiment of the present invention.

Next, referring to FIG. 6, a second embodiment of the present invention will be described in detail. FIG. 6 is a schematic plan view of a projection region of an active matrix substrate for use in a reflection type liquid crystal display apparatus according to the second embodiment of the present invention. The same components as those in the first embodiment are denoted by the same reference numerals, and descriptions thereof will be omitted.

The second embodiment differs from the first embodiment in that the density of the second through holes 112b in the region 12 is gradually reduced from the image display region 10 to the peripheral circuit region. That is, in the second embodiment, a plurality of second through holes 112b is disposed so that the density thereof in the black display region 11 is gradually reduced toward the outer edge of the black display region 11. The remainder of the arrangement is the same as that in the first embodiment, and descriptions thereof will be omitted. Although the density varies in two steps in FIG. 6 for the sake of simplicity, the present invention is not limited to the arrangement, and the density can vary in two or more steps.

With the arrangement described above, according to this embodiment, the inclination of the height difference that occurs in CMP can be further reduced, the black display uniformity can be further improved, and the image quality can be further improved than in the first embodiment.

Third Embodiment

Figure 7:
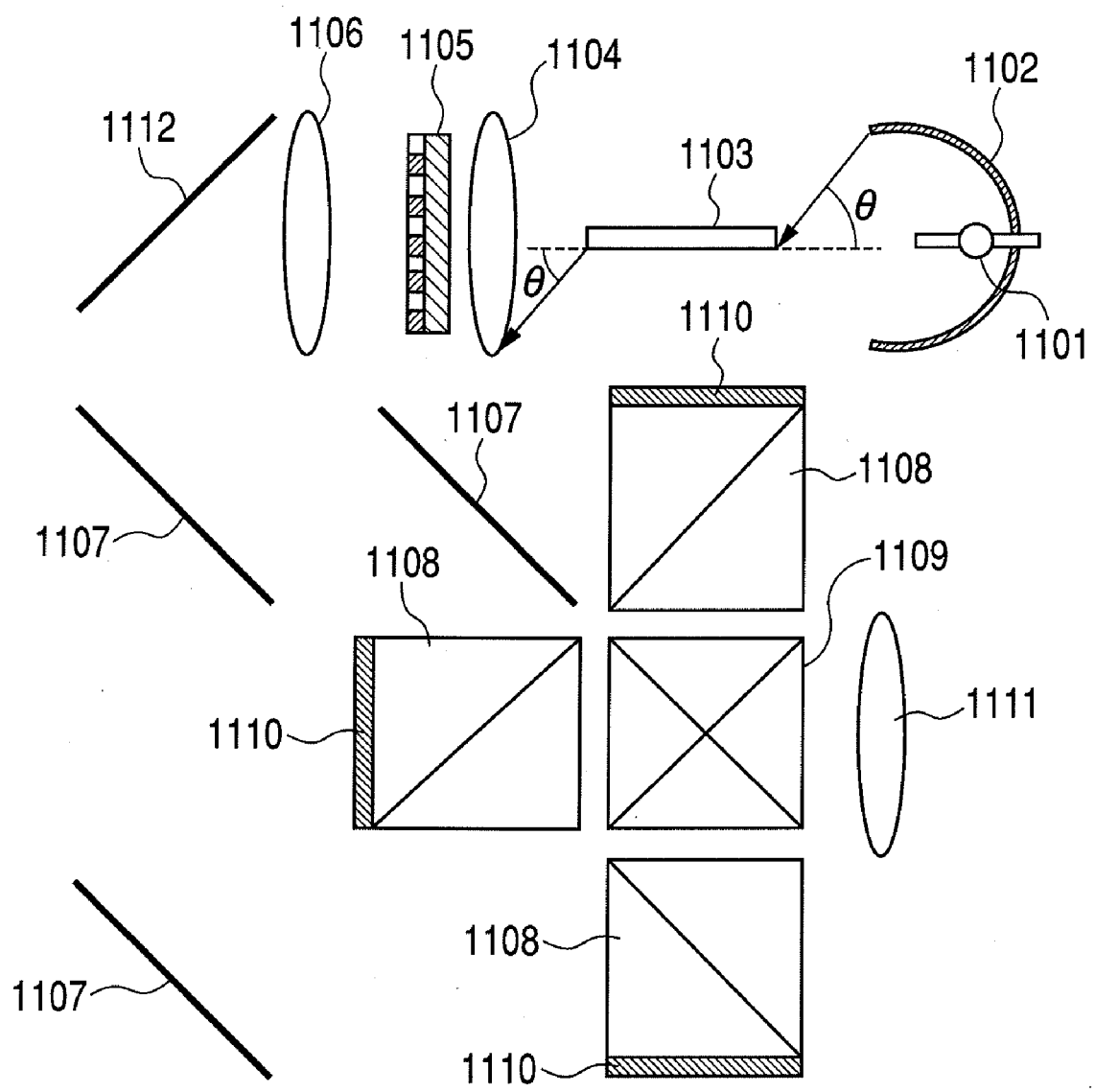
FIG. 7 is a conceptual view of an example of a liquid crystal projector system according to the present invention.

Next, a liquid crystal projector system using a reflection type liquid crystal display apparatus incorporating an active matrix substrate according to the present invention will be described. FIG. 7 is a conceptual view of an example of a liquid crystal projector system according to the present invention.

FIG. 7 shows a lamp 1101, a reflector 1102, a rod integrator 1103, a collimator lens 1104, a polarization converter system 1105, a relay lens 1106 and a dichroic mirror 1107. FIG. 7 further shows a polarization beam splitter 1108, a cross prism 1109, a reflection type liquid crystal panel 1110 incorporating an active matrix substrate according to the present invention, a projection lens 1111 and a total reflection mirror 1112.

A light flux emitted from the lamp 1101 is reflected by the reflector 1102 and collected at the input end of the integrator 1103. The reflector 1102 is an ellipsoidal reflector that has focuses at the point of light emission and the input end of the integrator 1103.

The light flux having entered the integrator 1103 is reflected zero to several times in the integrator and forms a secondary light source image at the output end of the integrator. While the secondary light source can be formed using a fly eye lens, description thereof will be omitted herein. The light flux from the secondary light source is substantially collimated through the collimator lens 1104 and is incident on a polarization beam splitter in the polarization converter system 1105.

The polarization beam splitter in the polarization converter system 1105 reflects the P wave, and a half-wave plate converts the reflected P wave into the S wave. The resulting light flux composed completely of the S wave is incident on the relay lens 1106. The light flux is collected on the panels by the relay lens 1106. In the path of the light flux collected on the panels, a color separation system including the color separating dichroic mirrors 1107, a polarizing plate (not shown), the polarization beam splitters 1108, the cross prism 1109 and the like is provided. The S wave is incident on each of the three liquid crystal panels 1110.

In the liquid crystal panel 1110, a liquid crystal shutter controls the voltage on a pixel basis according to the video to be displayed. In general, the S wave is reflected by the liquid crystal panels 1110 after being modulated into elliptically polarized light (or linearly polarized light) by the action of the liquid crystal, the P wave component transmits through the polarization beam splitters 1108, the cross prism 1109 achieves color synthesis, and the resulting light is projected through the projection lens 1111. In this way, the liquid crystal projector system is provided using the reflection type liquid crystal display apparatus according to the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-106802, filed Apr. 16, 2008, which is hereby incorporated by reference herein in its entirety.

What is claimed is:

1. An active matrix substrate for use in a reflection type liquid crystal display apparatus comprising:
   a display region including a first display region in which a plurality of first pixels each provided with a reflection electrode and a switching element for displaying an image are arranged on a substrate, and a second display region in which a plurality of second pixels each provided with a reflection electrode for displaying only a black displaying are arranged on the substrate;
   a wiring layer arranged between the switching element and a layer forming the reflection electrode;
   a light shielding layer arranged between the wiring layer and the layer forming the reflection electrode;
   a first through hole arranged between the wiring layer and the light shielding layer in the first display region, for electrically connecting the reflection electrode of the first pixel to the switching element of the first pixel; and
   a second through hole arranged between the wiring layer and the light shielding layer in the second display region, and being isolated electrically from the switching element.

2. The active matrix substrate according to claim 1, further comprising
   an interlayer insulation film arranged between the wiring layer and the light shielding layer, wherein the first and second through holes are formed in the interlayer insulation film, such that a plurality of the second through holes are formed in the second display region in a density lower than a density of the first through holes formed in the first display region.

3. The active matrix substrate according to claim 2, wherein
   the density of the second through hole gradually decreases in a direction toward an out side of the second display region.

4. The active matrix substrate according to claim 1, wherein
   the second display region includes a peripheral circuit region, in which a peripheral circuit for vertical or horizontal scanning the first display region is arranged, under the reflection electrode of the second pixel, and
   the second through hole is arranged in a region different from the peripheral circuit region.

5. The active matrix substrate according to claim 4, wherein
   the second through hole is arranged between the image display region and the peripheral circuit region.

6. The active matrix substrate according to claim 1, wherein
   the second display region includes a wiring region in which a constant voltage wiring, to which a predetermined fixed potential is applied, under the reflection electrode of the second pixel, and the second through hole is arranged in the wiring region.

7. The active matrix substrate according to claim 1, wherein
   the second through hole is connected to a wiring electrically isolated from the switching element.

8. A reflection type liquid crystal display apparatus comprising:
   an active matrix substrate according to claim 1;
   a transparent substrate arranged in opposition to the reflection electrode of the active matrix substrate; and
   a liquid crystal sealed between the active matrix substrate and the transparent substrate.

9. A liquid crystal projector system comprising: an reflection type liquid crystal display apparatus according to claim 8;
   a light source for illuminating with light the reflection type liquid crystal display apparatus; and
   a projection lens for projecting the light reflected from the reflection type liquid crystal display apparatus.

* * * * *